United States Patent
Buehlmeyer

(10) Patent No.: US 9,707,747 B2
(45) Date of Patent: Jul. 18, 2017

(54) METHOD FOR PRODUCING A FLAT PREPREG MATERIAL BLANK

(71) Applicant: MBB FERTIGUNGSTECHNIK GMBH, Beelen (DE)

(72) Inventor: Robert Buehlmeyer, Herzebrock-Clarholz (DE)

(73) Assignee: MBB Fertigungstechnik GmbH, Beelen (DE)

(*) Notice: Subject to any disclaimer, the term of this patent is extended or adjusted under 35 U.S.C. 154(b) by 1109 days.

(21) Appl. No.: 13/851,323

(22) Filed: Mar. 27, 2013

(65) Prior Publication Data
US 2013/0306228 A1    Nov. 21, 2013

(30) Foreign Application Priority Data
Mar. 27, 2012 (DE) .................. 10 2012 006 032

(51) Int. Cl.
*B29B 15/10* (2006.01)
*B32B 38/00* (2006.01)
*B29C 70/46* (2006.01)
*B29K 105/08* (2006.01)

(52) U.S. Cl.
CPC .......... *B32B 38/0012* (2013.01); *B29B 15/10* (2013.01); *B32B 38/0004* (2013.01); *B29C 70/46* (2013.01); *B29C 2793/0081* (2013.01); *B29K 2105/0872* (2013.01); *Y10T 156/1044* (2015.01); *Y10T 156/1075* (2015.01); *Y10T 156/1322* (2015.01)

(58) Field of Classification Search
None
See application file for complete search history.

(56) References Cited

U.S. PATENT DOCUMENTS

| | | | |
|---|---|---|---|
| 8,333,858 B2 | 12/2012 | Rubin et al. | |
| 2002/0004707 A1* | 1/2002 | Trudeau | B29C 70/543 702/33 |
| 2008/0020222 A1* | 1/2008 | Hiraku | B27D 1/08 428/541 |
| 2009/0076638 A1* | 3/2009 | Hu | B29C 70/38 700/97 |
| 2014/0339742 A1* | 11/2014 | Amtmann | B29C 70/46 264/496 |
| 2015/0217488 A1* | 8/2015 | Allman | B29C 70/48 264/152 |

FOREIGN PATENT DOCUMENTS

| | | |
|---|---|---|
| CN | 101528446 | 9/2009 |
| DE | 25 38 356 | 1/1976 |
| EP | 1433589 | 6/2004 |
| JP | 2003251702 | 9/2003 |

* cited by examiner

*Primary Examiner* — Barbara J Musser
(74) *Attorney, Agent, or Firm* — Michael J. Striker

(57) ABSTRACT

A method for producing a flat prepreg material blank impregnated with at least one matrix resin in an at least partially automated production system. The method includes cutting the fibrous material in a blanking station to the geometry of the particular prepreg material blank to be produced. The resultant fibrous blank is subsequently impregnated in an impregnation station. Then, the resultant single prepreg layer is joined in an assembly station with at least one further single prepreg layer, which was previously impregnated in the impregnation station, to form a multiple-layer prepreg material blank.

17 Claims, 3 Drawing Sheets

METHOD FOR PRODUCING A FLAT PREPREG MATERIAL BLANK

CROSS-REFERENCE TO A RELATED APPLICATION

The invention described and claimed hereinbelow is also described in German Patent Application DP 102012 006032.7, filed on Mar. 27, 9012. This German Patent Application, subject matter of which is incorporated herein by reference, provides the basis for a claim of priority of invention under 35 U.S.C. 119(a)-(d).

BACKGROUND OF THE INVENTION

The invention relates to a method for producing a flat prepreg material blank, to a method for producing a substantially shell-shaped, fiber-reinforced and to a production system for carrying out the method.

Flat prepreg material blanks are used as semi-finished products in the forming production of shell-shaped, fiber-reinforced plastic parts. Such fiber-reinforced plastic parts are found in numerous technical fields of application. The field of structural parts of motor vehicles is one example to mention here. Shell-shaped, fiber-reinforced plastic parts are required, for example, for columns, supports, crash elements, seats, or the like.

The prepreg semi-finished products are delivered as rolls or sheets to the particular production system, where they are cut to form a desired prepreg material blank and are subsequently formed and cured.

A prepreg material produced in a continuous procedure typically is used as the starting material for the aforementioned production of fiber-reinforced plastic parts. DE 25 28 356 A1 discloses a known production method based on the continuous production of prepreg material, which, after impregnation of a fibrous material, is cut to form a prepreg material blank.

A disadvantage of the known production method is that its use limits the possibilities for an optimized design for a specific application. For example, application of matrix resin that varies locally cannot be implemented using the known method. In light of this limited adaptability to downstream processes, no advantages are gained by integrating the known prepreg production into a production line for fiber-reinforced plastic parts.

Accordingly, prepreg semi-finished products are currently delivered from the outside to the production lines for producing fiber-reinforced plastic parts. The prepreg semi-finished products are initially stored in complex cooling systems in order to prevent a premature reaction of the matrix resin. The prepreg semi-finished products are typically covered with protective films for the same reason. The cooled storage is cost-intensive and automated handling is complex, in particular due to the use of the protective film.

SUMMARY OF THE INVENTION

The present invention overcomes the shortcomings of known arts, such as those mentioned above.

In an embodiment, the invention provides a method for producing a flat prepreg material blank such that includes an optimal parametrization of the prepreg material blank in a production that is as largely automated as possible.

The method includes first initially cutting the fibrous material (which has not yet been impregnated) at a blanking station to the geometry of the particular prepreg material blank to be produced. Depending on the application, an appropriate machining allowance can be provided to the size of the cut, which is removed in a subsequent trimming step.

After the fibrous material is cut, the resultant fibrous blank is impregnated in an impregnation station. Anny orientation of fibers can be implemented in the resultant fibrous blank by programming the blanking station accordingly. Furthermore, given suitable programmability of the impregnation station, the process parameters for impregnation are optimized depending on the surface region of the fibrous blank.

Finally, the resultant single prepreg layer is joined in an assembly station to at least one further single prepreg layer to form a multiple-layer prepreg material blank. The further single prepreg layer is impregnated previously impregnated in the impregnation station. The multiple-layer prepreg material blank is formed by joining different single prepreg layers having a different fiber orientation and different impregnation.

The method makes it possible to design prepreg material blanks that are fully oriented toward the particular application. In this respect, the integration of this method into a production line for the production of fiber-reinforced plastic parts is combined with the possibility of markedly improving the mechanical properties of the fiber-reinforced plastic part and of reducing costs. The cost reduction results primarily from the fact that complex stockpiling and complex handling can be largely eliminated.

The inventive method also supports reusability of materials due primarily to the fact that a dry fibrous material is used as the starting material, thereby allowing the trimmings produced in the blanking station to be fed, without after-treatment, to the production of new fibrous material.

Furthermore, the method includes homogeneously discarding or reusing a potential faulty application of matrix resin and curing agents, for example, outside the edge of the fibrous blank. Such operation is particularly useful when a resin application takes place spatially separately from the application of curing agent.

In an embodiment, a shaping station is disposed downstream of the assembly station. The shaping station is where the prepreg material blank is formed using a shaping tool. Accordingly, the invention also provides an interlinked production line in which the prepreg material blank produced as proposed is formed directly without any need for complex, cooling storage.

The invention also provides a method for producing a substantially shell-shaped, fiber-reinforced plastic part in an at least partially automated production system. Therein, a prepreg material blank is placed in a shaping station comprising a shaping tool. The shaping tool has an upper matrix and a lower matrix. Preferably, the shaping tool is closed in order to form the material blank, thereby forming or producing the prepreg material blank.

The method for producing a substantially shell-shaped, fiber-reinforced plastic part utilizes the method for producing a prepreg material blank.

The invention also provides production systems that carry out one of the proposed methods. Therein, the following are installed downstream of a blanking station in the aforementioned sense: an impregnation station installed downstream of the blanking station, and an assembly station installed downstream of the impregnation station.

BRIEF DESCRIPTION OF THE DRAWING FIGURES

The invention is explained in greater detail in the following with reference to a drawing. In the drawing.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
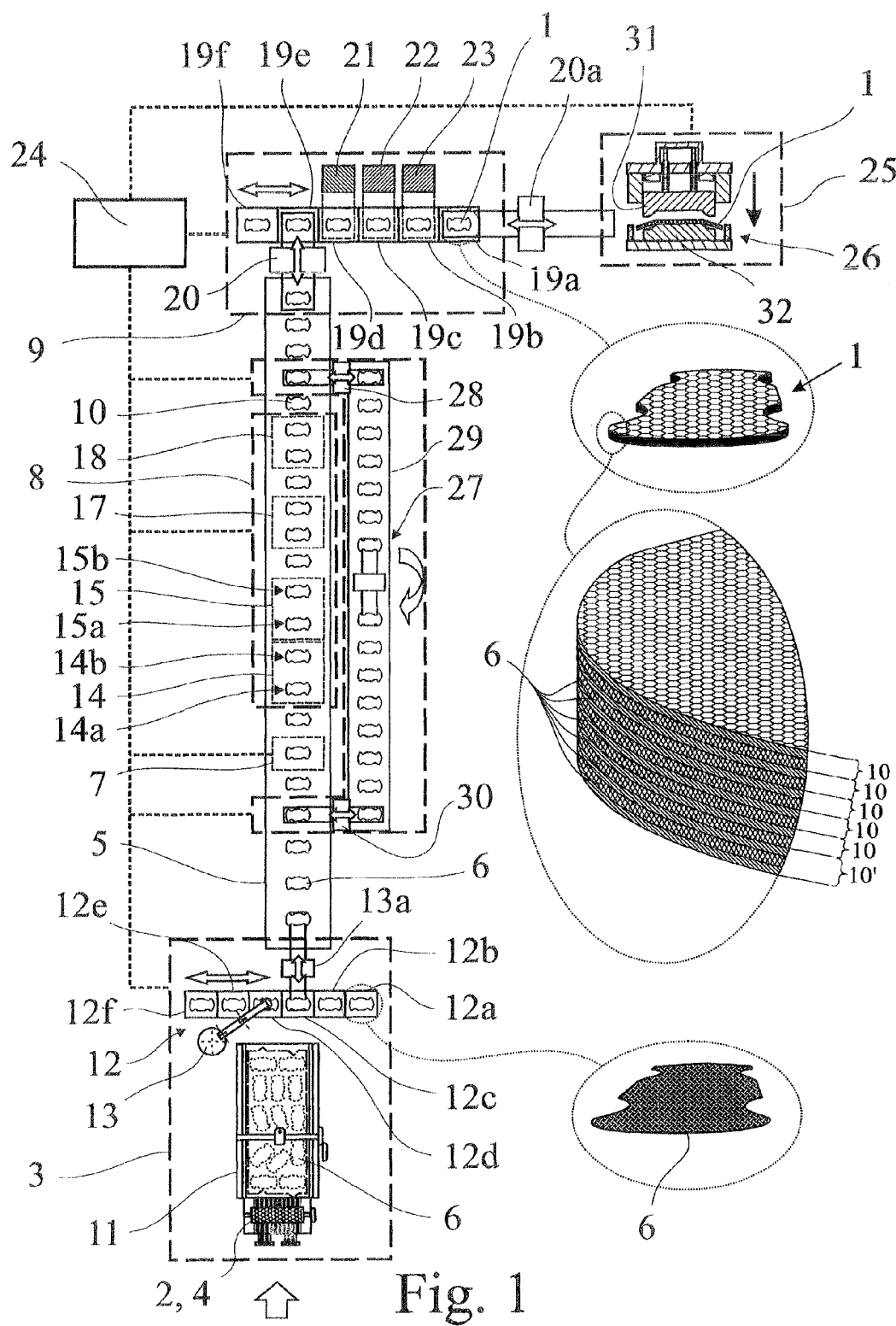
FIG. 1 shows a production system for carrying out the proposed method, in a schematic top view.

FIG. 1 depicts a production system used to carry out the proposed method for producing a flat prepreg material blank 1. The production system is fully automated, meaning that all the processes that take place in the production system take place automatically and that workpiece transport between processing stations in the sense of a fully linked production system also takes place automatically. Please note, however, that it is also feasible that the production system is only partially automated. This semi-automated embodiment thereby allows various process and/or transport steps to take place manually.

Different prepreg materials are used for the prepreg material blank 1 to be produced. Very generally, such prepreg materials are created from rovings, textiles, and/or multiaxial structures and are impregnated with a matrix resin. The fibrous materials 2 to be impregnated are preferably GFRP materials or CRP materials. The matrix resin is a solvent-containing or water-based epoxy resin, a powdered material, a hot melt, a phenol system, a polyester-/vinyl ester- or acrylic resin-system or the like. This listing of possible materials is not intended to be limiting.

In the method, the fibrous material 2 is initially cut at a blanking station 3 to the geometry of the particular prepreg material blank 1 to be produced. The fibrous material 2 is fed to the blanking station 3 continuously in the form of a fiber roll 4. Alternatively, the fibrous material 2 is fed in the form of fibrous mats or the like to the blanking station 3.

The blanking station 3 is adjoined by a linear conveying device 5, The linear conveying device 5 is designed as a conveyor belt. After the fibrous blank 6 is transferred to the conveyor belt 5, the fibrous blank 6 reaches a centering station 7. The centering station can function manually or in a sensor-based manner. The sensor-based centering station 7 as shown in FIG. 1 ascertains the orientation of the transferred fibrous blank 6 by way of a camera. This orientation is significant for downstream process steps, as explained below.

Next, the fibrous blank 6 reaches an impregnation station 8, where it is impregnated with a matrix resin. The impregnation comprises the application of a matrix resin and the subsequent application of a curing agent.

Next, the fibrous blank 6, which has been wetted with matrix resin and curing agent, passes through drying and cooling processes before reaching an assembly station 9. In the assembly station 9, the resultant individual prepreg layer 10 is joined with at least one further individual prepreg layer to form a multiple-layer prepreg material blank 1. The finished multiple-layer prepreg material blank 1 is then fed directly to a forming operation.

The blanking station 3 comprises at least one 2-D cutter 11. Downstream of the at least one 2-D cutter 11 at least one blank storage area 12 is installed. A handling device 13 is provided between the 2D cutter 11 and the blank storage area 12. The transfer station 13a transfers the fibrous blanks 6 from the blank storage area 12 to the conveyor belt. It is also possible to load various blank storage areas, which are fed to the system by way of linking (buffer station).

Figure 2A:
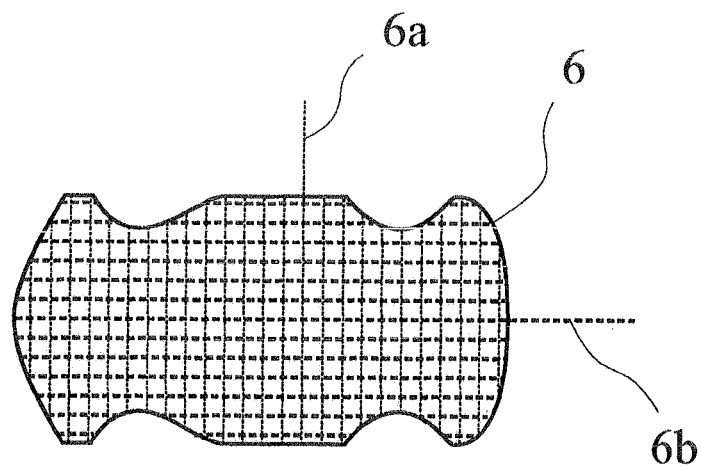
FIG. 2a shows two proposed fibrous blanks having a first fiber orientation in a schematic top view.
Figure 2B:
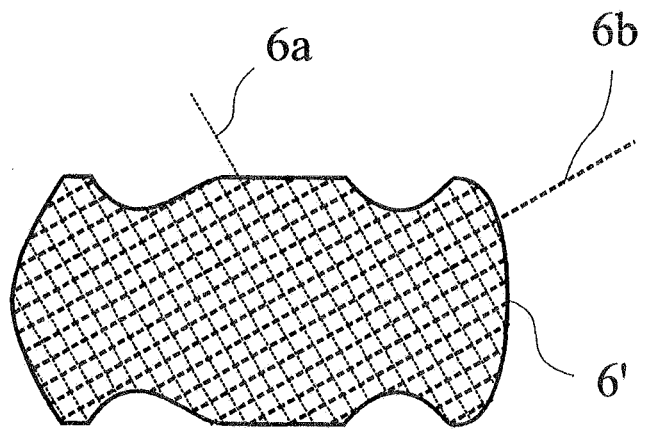
FIG. 2b shows two proposed fibrous blanks having a second fiber orientation (as compared to the first fiber orientation in FIG. 2a) in a schematic top view.

FIG. 1 shows that a plurality of fibrous blanks 6 having very different orientation have been cut from the fibrous material 2. As a result, largely any fiber orientation within a fibrous blank, can be selected. FIGS. 2a and 2b show, two fibrous blanks 6, 6', respectively, which are identical in respect of the outline but are different in respect of the fiber orientation. The fiber orientation is indicated in the figures using dashed lines within the fibrous blanks 6, 6'. Preferably, the fibrous blank 6, 6' is a woven fabric, the warp threads of which are indicated by reference sign 6a and the weft threads of which are indicated by reference sign 6b.

The blank storage area 12 is preferably equipped with a number of storage places 12a-f that correspond to the number of layers of the prepreg material blank 1 to be produced. Preferably, the prepreg material blank 1 is a 6-layer material blank, as shown in the upper detailed depiction in FIG. 1.

Basically it is feasible for every fibrous blank 6 to be marked in any manner. This renders it possible to account for the "type" of fibrous blank in downstream process steps, in particular in the impregnation.

It is also feasible, however, for every storage location 12a-f to be marked, thereby allowing information regarding the removal location to be "transferred" upon transfer to the conveyor belt 5. In this case, the same "type" of a fibrous blank 6 must always be placed in a certain storage location 12a-f. Please note that the above-described marks can be implemented using RFID chips, barcodes, or like devices without limitation.

The fibrous blank 6 is wetted in the impregnation station 8 with a matrix resin and a curing agent. It also is feasible only for a matrix resin to be applied onto the fibrous section 6 in the impregnation station 8. Preferably, the resin is applied in a resin-application station 14 and the curing agent is applied in a curing-agent station 15, wherein the resin-application station 14 is spatially separated from the curing-agent application station 15.

The resin is applied within the resin-application station 14 in two steps, namely in a first step 14a and in a second step 14b. The two steps are depicted schematically in respective FIGS. 3a and 3b. The two-step approach allows matrix resin to be applied nearly all-over using an arrangement having a particularly simple design.

Preferably, the matrix resin is applied via simple application nozzles 16a, 16b, which apply the liquid matrix resin onto the fibrous blank 6. The fibrous blank 6 (FIG. 3a) is first moved under a nozzle arrangement having the application nozzles 16a and then (FIG. 3b), under a nozzle arrangement having the application nozzles 16b. Relative to the particular fibrous blank 6 positioned underneath the corresponding valve arrangement, the application nozzles 16a, 16b are offset with respect to one another, whereby matrix resin acts on the fibrous blank 6 in almost flat manner overall.

Figure 3A:
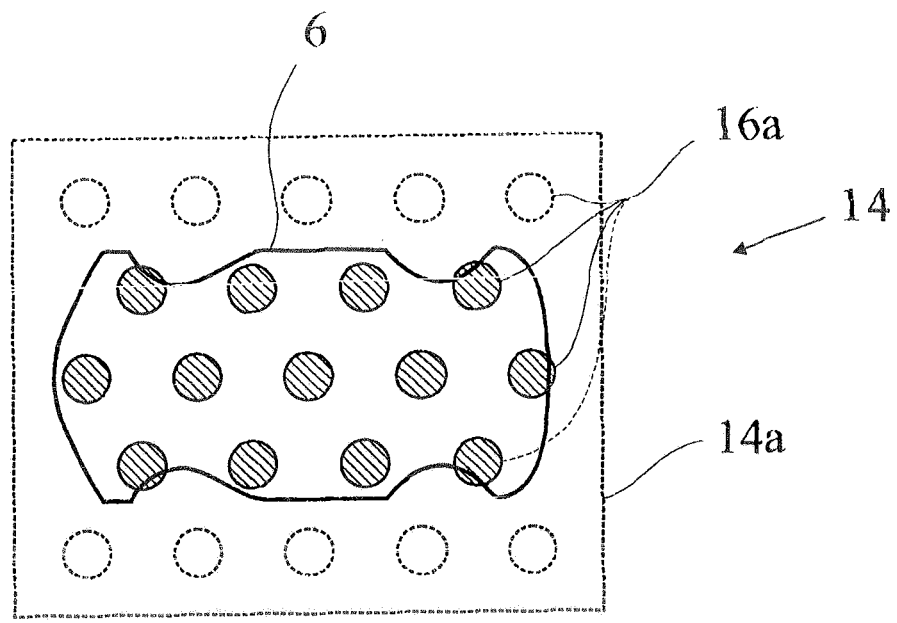
FIG. 3a shows a first section of a resin-application station in a schematic top view.
Figure 3B:
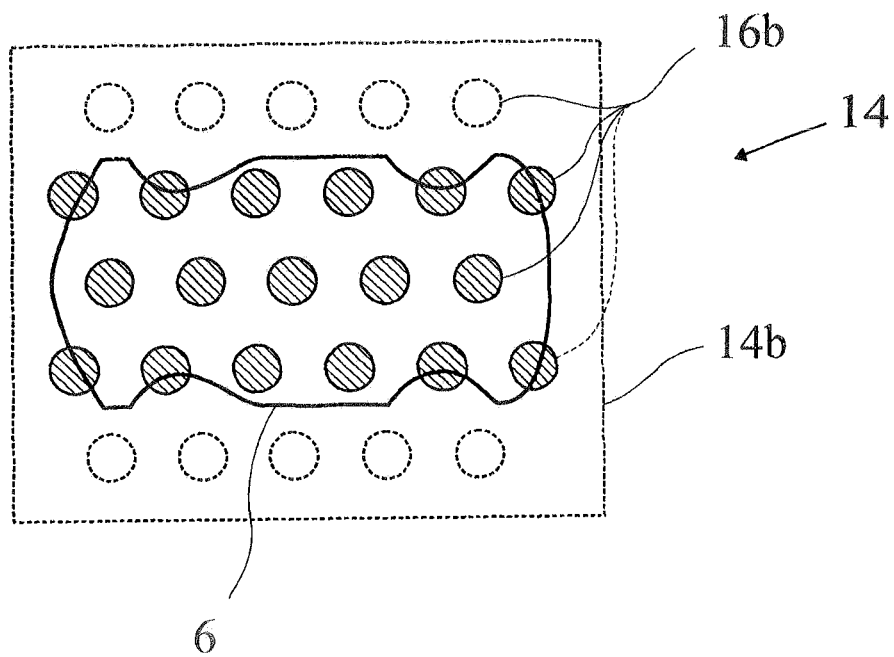
FIG. 3B shows a second section of the resin-application station in a schematic top view.

As can be seen in FIGS. 3a and 3b, the application nozzles 16a, 16b can be activated and deactivated individually as needed. The deactivated application nozzles 16a, 16b are depicted in the figures using dashed lines. The activation or deactivation takes place depending on the geometry of the fibrous blank 6 and the position of the fibrous blank 6 on the conveyor belt 5. The corresponding actuation of the application nozzles 16a, 16b is carried out depending on the sensor signals from the centering station 7.

Given that the application nozzles 16a, 16b are arranged in the manner of a matrix relative to the surface of the fibrous blank 6, a surface-specific application of resin can be implemented, within certain limits. This surface-specific resin application is specified with respect to control as explained below.

Numerous advantageous variants of the specific application of resin are feasible. In particular, it can be advantageous to provide matrix resin as powder and apply it as a powder coating (powder scattering system).

The application of curing agent in the curing-agent application station 15 is implemented basically identically to the resin application described above. In particular, curing agent is applied in the two steps according to FIGS. 3a and 3b, respectively. All comments regarding the application of resin apply similarly to the application of curing agent.

If FIG. 1, the resin-application station 14 is spatially separated from the curing-agent application station 15, as explained. This is advantageous considering that the resin and the curing agent are applied flat onto an application surface, which also approximately corresponds to the surface of the fibrous blank 6 to be wetted. FIGS. 3a and 3b show that, due to the very crude matrix of application nozzles 16a, 16b, the application of matrix resin or curing agent outside of the fibrous blank 6 cannot be avoided. This faulty application must be disposed of or reused in some manner in a particularly simple manner due to the spatial separation of resin application and curing-agent application. Resin and curing agent can therefore be easily disposed of or reused in a homogeneous manner.

It also is feasible for the resin application and the curing-agent application to be combined into a single step. So-called mixing heads, which can apply matrix resin and curing agent simultaneously to a fibrous blank 6, are described.

The fibrous blank 6 wetted with matrix resin and curing agent is dried in a drying station 17. The drying takes place under the influence of heat, in particular, in order to cross-link the resin/curing agent mixture with the fibrous material 2. Next, the dried fibrous blank 2 passes through a cooling station 18, in order to specifically counteract an activation of matrix resin and curing agent after the cross-linking.

The assembly station 9 is equipped with a total of six assembly points 19a-f, onto each of which a number of single prepreg layers 10 is placed. A transfer station 20 is provided for this purpose, which is disposed between the conveyor belt 5 and the assembly points 19a-f.

A fixing step 21 is carried out or assigned to the assembly station 9. In the fixing step, the single prepreg layers 10 disposed in the particular assembly position 19a-f are fixed. The fixation can be implemented in various ways. Preferably, the fixation takes place via engagement of heated pins with the individual prepreg layers 10 disposed at the particular assembly point 19a-f. As long as a thermoplast binding portion is contained in the particular single prepreg layers 10, the thermoplast binding portion can be activated for the fixation.

The assembly station 9 further comprises an insert-feed station 22. Therein, inserts such as reinforcing elements or the like are applied on or between the single prepreg layers 10. Preferably, the assembly station 9 is finally equipped with a marking station 23. In the marking station, for example, an RFID chip or a bar code is applied onto the single prepreg layers 10, preferably onto the uppermost single prepreg layer 10.

The proposed method can be used to produce a prepreg material blank 1 that is specifically parametrized for a certain application. That is, the inventive method makes it possible to individually set the fiber orientation, the resin application, and the curing-agent application layer-by-layer.

In order to fully utilize the possibilities with respect to the optimization of the prepreg material blank 1, a production control 24 is preferably provided, which is depicted merely schematically in FIG. 1.

Material parameters of the prepreg material blank 1 to be produced, such as the blank geometry, the number of layers, the application of matrix resin and curing agent to the individual layers, the fiber orientation in the individual layers, etc., are preferably stored in a product data model in the production control 24. The production control 24 is coupled for control purposes to the blanking station 3, the centering station 7, the impregnation station 8 and the assembly station 9. Therefore, cutting can be carried out in the blanking station 3, and/or impregnation can be carried out in the impregnation station 8 and/or assembly can be carried out in the assembly station 9 depending on the product data model stored in the production control 24.

In an embodiment, a shaping station 25 is installed downstream of the assembly station 9 via the transfer station 20a. The prepreg material blank 1 is formed using a shaping tool 26 in the shaping station in a manner known per se. The downstream installation of the shaping station 25 enables the production of a prepreg material blank 1 integrated into a production system for producing a fiber-reinforced plastic part.

Preferably, the blanking station 3, the impregnation station 8, the assembly station 9, an optionally provided shaping station 25, and further optionally-provided stations installed upstream, downstream, or in-between are linked in the manner of an automated production system. This means that the relevant stations are coupled with respect to conveyance with any types of handling devices.

Alternatively or additionally, the invention provides that the following take place in an automated manner: the blank in the blanking station 3, the impregnation in the impregnation station 8, the assembly in the assembly station 9 and the forming in the optionally provided shaping station 25.

The production system enables matrix or resin to be applied to both sides of the fibrous blank 6. A turning 27 station, which is installed parallel to the conveyor belt 5, is provided for this purpose. If the objective is to impregnate the second side of a fibrous blank 6 that has already been impregnated on one side, decoupling from the conveyor belt 5 via the transfer station 28 installed downstream of the impregnation station 8 is possible. Doing so requires that the fibrous blank 6 reaches the turning station 27 by way of a further conveyor belt 29. After turning is carried out in the turning station 27, the fibrous blank 6 that has been turned can be coupled into the conveyor belt 5 via the transfer station 30. This occurs upstream of the impregnation station 8 and preferably upstream of the centering station 7 to allow the second side of the fibrous blank 6 to be impregnated.

In the finished prepreg material blank 1 (see upper detailed depiction in FIG. 1), the turning station 27 is significant for the lowest layer 10'. The lowest single prepreg layer 10' as shown was acted upon with matrix resin and curing agent on both sides using the turning station 27. The single prepreg layers 10 located above said lowest layer have each been acted upon with matrix resin and curing agent on only one side. By way of appropriate assembly, it is possible for one layer of matrix resin and curing agent (shaded in the upper detailed depiction in FIG. 1) to always be located between two layers of fibrous material (shown as dots in the upper detailed depiction in FIG. 1).

The invention also includes a method for producing a substantially shell-shaped, fiber-reinforced plastic part in an at least partially automated production system. In the method, a prepreg material blank 1 is placed in an above-described shaping station 25 comprising a shaping tool 26 with an upper matrix 31 and a lower matrix 32. The shaping tool 26 is then closed in order to form the prepreg material blank 1.

The method therefore relates to the aforementioned integration of the proposed, initially described method into the production of a fiber-reinforced plastic part and to a production system for carrying out the proposed method. Reference is also made in this regard to all the comments related to the entire system shown in FIG. 1. As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for producing a flat prepreg material blank (1) in an at least partially automated production system, in which a fibrous material (2) is impregnated with at least one matrix resin, comprising steps of:
    cutting the fibrous material (2) in a blanking station (3) to the geometry of a particular prepreg material blank (1) to be produced, resulting in a fibrous blank (6);
    ascertaining an orientation of the fibrous blank (6) at a sensor-based centering station (7), located downstream of the blanking station (3);
    impregnating the fibrous blank (6) in an impregnation station (8), located downstream of the sensor-based centering station (7), resulting in a single prepreg layer (10); and
    joining the resultant single prepreg layer (10) in an assembly station (9) with at least one further single prepreg layer that was previously impregnated in the impregnation station (8), to form a multiple-layer prepreg material blank;
    wherein the at least one further single prepreg layer that was previously impregnated in the impregnation station, to form the multiple-layer prepreg material blank, has a different fiber orientation, a different impregnation or both, than the resultant single prepreg layer (10).

2. The method according to claim 1, further comprising feeding the fibrous material (2) continuously to the production system as rolls.

3. The method according to claim 1, wherein the step of cutting includes cutting the fibrous material (2) in the blanking station (3) according to a geometry of the prepreg material blank (1) to be produced depending on a fiber orientation of the fibrous material (2).

4. The method according to claim 1, further comprising storing the fibrous blank (6) an at least one blank storage area (12).

5. The method according to claim 4, wherein the at least one blank storage area (12) has a number of storage places (12a-f) that correspond at least to the number of layers of the prepreg material blank (1) to be produced.

6. The method according to claim 1, further comprising wetting the fibrous blank (6) in the impregnation station (8) with a matrix resin.

7. The method according to claim 6, wherein the fibrous blank (6) also is wetted with a curing agent.

8. The method according to claim 6, further comprising, in a resin-application station (14) in the impregnation station (8), spatially separating the resin application from the curing-agent application in a curing-agent application station (15) and applying a curing agent after resin is applied.

9. The method according to claim 8, wherein resin and/or the curing agent are applied flat onto an application surface, which approximately corresponds to a surface of the fibrous blank (6) to be wetted.

10. The method according to claim 7, wherein the wetted fibrous blank (6) is one of: dried in a drying station (17), cooled in a cooling station (18) or both.

11. The method according to claim 10, further comprising applying inserts onto or between the individual prepreg layers (10) in the assembly station (9) and marking the resultant, multiple-layer prepreg material blank in the assembly station (9).

12. The method according to claim 1, further comprising providing a production control (24) in which the material parameters of the prepreg material blank (1) to be produced are stored in a product data model.

13. The method according to claim 12, wherein the material parameters include the blank geometry, the number of layers, the matrix resin and curing-agent application in the individual layers and the fiber orientation in the individual layers.

14. The method according claim 1, wherein cutting is carried out in the blanking station (3), impregnation is carried out in the impregnation station (8), assembly is carried out in the assembly station (9) and a combination thereof depending on the product data model.

15. The method according claim 1, wherein a shaping station (25) is installed downstream of the assembly station (9) in which the prepreg material blank (1) is formed by way of a shaping tool (26).

16. The method according to claim 1, wherein the blanking station (3), the impregnation station (8), the assembly station (9) and a shaping station (25) and optionally provided stations installed upstream, downstream, or in-between are linked to form an automated production system; or that cutting in the blanking station (3), impregnation in the impregnation station (8), assembly in the assembly station (9) and forming in the optionally provided shaping station (25), or both, take place in an automated manner.

17. A production system for carrying out a method for producing a flat prepreg material blank (1) in which a fibrous material (2) is impregnated with at least one matrix resin, comprising:
    a blanking station (3) for cutting the fibrous material (2) to a geometry of the particular prepreg material blank (1) to be produced, resulting in a fibrous blank (6);

a sensor-based centering station (7), located downstream of the blanking station (3), for ascertaining an orientation of the resultant fibrous blank (6);

an impregnation station (8), located downstream of the sensor-based centering station (7), for impregnating the fibrous blank (6), resulting in a single prepreg layer (10); and an assembly station (9), located downstream of the impregnation station (8), for joining the resultant single prepreg layer (10) with at least one further single prepreg layer, which further single prepreg layer was previously impregnated in the impregnation station (8) to form a multiple-layer prepreg material blank;

wherein the at least one further single prepreg layer (1) that was previously impregnated in the impregnation station (8) to form the multiple-layer prepreg material blank, has a different fiber orientation, a different impregnation or both, than the resultant single prepreg layer (10).

* * * * *